Patented Mar. 26, 1940

2,195,258

UNITED STATES PATENT OFFICE 2,195,258

PRODUCTION OF COLOR LAKES

George Ashley Peirce, Westfield, N. J., assignor to E. I. du Pont de Nemours & Company, Wilmington, Del., a corporation of Delaware No Drawing. Application September 2, 1937, Serial No. 162,145

11 Claims. (Cl. 260—270)

This invention relates to the production of color lakes and toners, and more particularly to the production of improved and valuable complex pigments from basic dyestuffs precipitated or converted through the medium of heteropoly acid employment.

Complex heteropoly acids, i. e., those containing phosphorus, molybdenum, silicon and tungsten, such as phosphotungstic, phosphomolybdic, or phosphotungstomolybdic, etc. acids, are well known precipitants for basic dyestuffs and frequently employed in the preparation of pigment complexes. Similarly, it is known that the substitution of phosphorus by an element such as silicon in such complex acids affords the production of relatively unstable silicotungstates. The pigment complexes formed as a result of interacting these unstable silicotungstates with basic dyes are very unsatisfactory, however, and of little or no commercial interest, due to their inherent lack of requisite pigment properties and invariable dirty or off-color tints or shade effects.

I have discovered, however, that unexpectedly improved color lakes, toners and pigments possessing inherently very great strength and high fastness towards light, are obtainable if certain other metallic agents are employed or present as essential ingredients or components in a phospho-heteropoly type of complex acid employed in effecting precipitation of the basic dyestuff.

In accordance with the present invention, therefore, it is among its objects to produce a highly improved and valuable complex pigment, possessing excellent pigmentary properties, including very high fastness to light and fade resistance, excellent texture, very great tinctorial strength, and desired brightness of shade.

The foregoing as well as other objects and advantages are obtainable in the present invention, which broadly comprises completely or partially substituting for the tungstates or molybdates present in a complex phospho-heteropoly acid employed as a precipitant for basic dyes, an element or a compound of an element from the first sub-group of group V of the periodic table of elements, i. e., vanadium, columbium, or tantalum.

More specifically, the present invention comprises replacing part or all of the tungstates or molybdates, or both, used with phosphates in the preparation of complex heteropoly acids, for the precipitation of basic dyes, with salts of vanadium, columbium, or tantalum; or, in the alternative, employing relatively small amounts of such salts as addition agents to the usual amounts of tungstates and/or molybdates present in complex phospho-heteropoly acids.

In adapting the invention to practice and in instances where a pigment possessing very high strength of color is particularly desired, a suitable complex phospho-heteropoly acid precipitant of my invention may be obtained by reacting in aqueous solution a soluble salt of vanadium, such as sodium ortho vanadate, with a phosphate such as disodium phosphate, in relatively strong mineral acid, i. e., hydrochloric or sulfuric acid. The phospho-heteropoly complex acid obtained may be then added directly to a solution of a basic dyestuff, whereupon the latter becomes converted, and precipitation of the desired complex pigment is effected. The resultant pigment product will be found to be relatively high in strength and much strong than similar pigments prepared in the known manner from sodium tungstate and/or molybdate.

In a preferred embodiment of my invention, and in order to obtain a complex pigment possessing both superior strength of color, as well as excellent stability towards light and fade resistance, I have found it especially desirable to employ relatively small or minor amounts of soluble salts of vanadium, particularly those of vanadic acid, such as the vanadates, adding an aqueous solution thereof to a reaction mixture containing sodium tungstate and/or molybdate, together with a suitable phosphate, such as disodium phosphate. I preferably effect such addition prior to addition of the mineral acid, as in the well-known preparation of complex heteropoly acids for use in the production of phosphotungstic acid pigments. For the purpose, I have found it suitable and preferable to add to the reaction mixture an amount of vanadium salt equivalent to approximately 3–10% of the sodium molybdate (or tungstate) employed in making up the complex acid.

In instances where the preferred embodiment of my invention is adopted, it will be found that partial, rather than complete, substitution of tungsten and/or molybdenum by vanadium results in the phospho-heteropoly acid obtained. While such partial substitution is more desirable because of the preferential benefits arising under my invention, obviously, larger amounts of my novel treating agents may be employed and more complete substitution or replacement effected. For instance, if desired, the tungsten and/or molybdenum in the phospho-heteropoly acid may be completely substituted by vanadium and a complex phospho-heteropoly acid precipitant obtained which will be within the contemplation of my invention. Thus, I may employ an amount of soluble vanadium salt ranging in equivalency as high as 100% of the sodium molybdate (or tungstate) present in the reaction mixture, whereby a phospho-heteropoly acid precipitant is obtained in which no tungsten and/or molybdenum will be present. In instances of larger vanadium salt employment and consequent higher substitution or replacement of the molybdenum and/or tungsten by vanadium, however, it will be found that as the extent of molybdenum and/or tungsten substitution approaches completion, the light resistance characteristics of the basic dyestuff pigment precipitated by its use will proportionally diminish or decrease, although the complex pigment resulting in any event will exhibit unusually high color strength.

In order that the invention may be more clearly understood, the following examples are given, which are merely illustrative in nature and in no wise in restriction of the broad concepts of the invention:

Example 1

64 parts of technical sodium ortho vanadate are dissolved in 800 parts of boiling water and 7.75 parts of 100% hydrochloric acid are added slowly to partially neutralize the alkalinity and the mixture boiled for 5 minutes. 64 parts of disodium phosphate in 400 parts of water are then added at the boil, the mixture again boiled for 5 minutes, followed by the addition of 12.1 parts of 100% hydrochloric acid and the boiling continued for 5 minutes. The resulting solution of the complex heteropoly acid (at 95° C.) is then added in 3-4 minutes to a solution of a basic dye prepared by dissolving 16 parts of Crystal Violet powder (Color Index #681) (hexamethyl-triamino-triphenylcarbinol hydrochloride) in 1600 parts of water at the boil and, after solution is complete, diluting to 2000 cc. at 60° C. After stirring a few minutes at 60° C., the slurry is quenched with cold water, filtered, washed free of acid and dried. 22 parts of a very strong purple pigment result which is stronger than a similar pigment using sodium tungstate in place of the sodium vanadate.

Example 2

30 grams of anhydrous sodium tungstate and 8.6 grams of anhydrous sodium molybdate are dissolved in 1500 cc. of boiling water and 1 gram of sodium ortho vanadate is added followed by 5 grams of disodium phosphate ($Na_2HPO_4.12H_2O$). To this boiling solution is added 14.5 grams of sulfuric acid (100%) followed by a solution of 0.8 gram of gallic acid in 20 cc. of water. The solution is boiled three minutes and then a boiling solution of 18 grams of Victoria Pure Blue BO (ethylamino-naphthyl tetra ethyl diamino diphenyl carbinol hydrochloride) in 3500 cc. of water is added during a period of 5 minutes. The precipitated pigment is boiled for 15 minutes and then isolated in the usual manner by filtering, washing and drying. 42 grams of a bright blue pigment is obtained which is somewhat stronger than a similar pigment prepared without the use of the sodium ortho vanadate.

Example 3

21.6 grams of sodium molybdate, 2 grams of sodium ortho vanadate ($Na_3VO_4.16H_2O$) and 4.35 grams of disodium phosphate ($Na_2HPO_4.12H_2O$) are dissolved in 1500 cc. of boiling water. This solution is acidified at the boil with 10.4 grams of sulfuric acid (100%) and then treated with 30 cc. of a solution containing 1 gram of gallic acid. To this boiling solution, 3500 cc. of a boiling solution containing 14 grams of Victoria Pure Blue BO is added over a period of 5 minutes. The precipitated pigment is boiled for 15 minutes, quenched, filtered, washed and dried in the usual manner.

Example 4

In place of Victoria Pure Blue BO shown in Example 3, I may use 12.2 grams of Rhodamine 6G (Color Index No. 752) (ethyl ester of diethyl-diamino-o-carboxy-phenyl-xanthenyl chloride) and slightly more sulfuric acid (11.1 grams in place of 10.4 grams). 24 grams of a brilliant red pigment of exceptional strength is obtained.

Example 5

17.2 grams of $Na_2MoO_4$, 1 gram of $NH_4VO_3$ and 3.7 grams of $Na_2HPO_4.12H_2O$ are dissolved in 1 liter of boiling water. To this solution is added 6.5 grams of HCl (100%) following in turn by 1 gram of gallic acid and 3 grams of para soap, both in about 10% solution in water. The solution is boiled 2 minutes and then added in 3 minutes to a solution of 12 grams of Methylene Blue (Color Index No. 922) (tetramethyl-diamino-diphenaz-thionium chloride) in 2000 cc. of boiling water. The resulting pigment is a brilliant greenish shade of blue.

While, in the foregoing examples, the invention has been illustratively described employing sodium ortho vanadate or ammonium meta vanadate, these are merely set forth since they are readily available salts of vanadium and represent preferred agents. It will be understood, of course, that all soluble salts of vanadic acid, i. e., the vanadates, such as the sodium, potassium, ammonium and magnesium salts of meta, ortho or pyro vanadate, are utilizable.

Similarly, while the invention has been specifically described in connection with the use of vanadium, it will be understood that other metals of the first sub-group of group V of the periodic table, particularly tantalum and columbium, are also useful in the invention and the soluble salts of these latter metals, such as those of sodium tantalate, sodium columbate or the corresponding potassium or magnesium salts, may be used in substitution on an equivalent molecular basis for the sodium or ammonium vanadates mentioned.

The disodium phosphate used in the examples is used because of its ready availability and may be replaced with any soluble phosphate such as the monobasic, dibasic or tribasic phosphates of sodium, ammonium, potassium etc., or even with phosphoric acid, but in such cases it may be necessary to adjust the amount of mineral acid used in order to maintain a given acidity of the complex heteropoly acid formed.

Similarly, while disclosure and mention of certain specific basic dyestuffs has been set out, it is to be understood that the invention has general application to the precipitation or conversion of all types of basic dyestuffs, including those containing acid groups, or mono or polynuclear aromatic compounds containing one or more primary, secondary or tertiary amino groups, whereby such dyes are converted into valuable color lakes or pigments, by the use of my novel phospho-heteropoly acids. Such dyes may be employed alone or suitable mixtures of the same are utilizable in the invention. Typical examples of other utilizable basic dyes include the following:

Victoria Green SC (Color Index No. 657)
Brilliant Green B (Color Index No. 662)
Rhodamine B (Color Index No. 749)
Glacier Blue (Color Index No. 664)
Thioflavine TCN (Color Index No. 815)

It will also be apparent that the color lakes obtainable in the present invention may be produced in the presence of suitable substrata usually employed in the color lake industry, such as, for instance, heavy spar, alumina hydrate or a mixture of the latter with blanc fixe and the like, and that the process may be carried out with the addition or in the presence of well known dispersing agents, such as Turkey red oils or the sulfates of aliphatic alcoholic compounds containing at least 8 carbon atoms in their alcoholic residue, for example, those of octyl, decyl, dodecyl or myristyl, etc. Likewise, the invention may be carried out at an elevated temperature and under ordinary or elevated pressures. In general, temperatures of the order not to exceed 200° C. will be found sufficient for all practical purposes.

It will be obvious from the foregoing that my invention provides an improved method of manufacturing complex pigments from basic dyes, which pigments have a very wide field of usefulness, coinciding in every respect with the already wide field in which colored pigments are employed. It will also be obvious that my invention enables the preparation of complex pigments from basic dyes possessing a greater strength than has been possible with any of the commonly used methods and without loss in light fastness, which has heretofore been common to such pigments of high strength. In other words, the invention affords the production of a pigment having very high color strength in conjunction with desired light fastness or fade resistance.

The term "phospho-heteropoly acid," as here employed and in the appended claims, embraces all of the various types of heteropoly acids which contain, in addition to phosphorus, tungsten and/or molybdenum, or other metallic elements, in various combinations, i. e., the phosphorus being present as an essential ingredient in the heteropoly nucleus or combination.

I claim as my invention:

1. A process for producing pigments of improved strength and high fastness towards light from basic dyes comprising precipitating the basic dye with a complex phospho-heteropoly acid containing as an essential ingredient a metallic element from the first sub-group of group V of the periodic table of elements.

2. A process for producing complex pigments of improved strength and high fastness towards light from basic dyes comprising precipitating said basic dye with a complex heteropoly acid containing phosphorus, tungsten and molybdenum, and a minor proportion of a metal of the first sub-group of group V of the periodic table of elements.

3. A process for producing complex pigments of improved strength and high fastness towards light from basic dyes comprising precipitating said basic dye with a complex heteropoly acid containing phosphorus, tungsten and molybdenum and a metal of the first sub-group of group V of the periodic table of elements, said metal being in partial substitution for the tungsten-molybdenum content of the heteropoly acid.

4. A process for producing complex pigments of improved strength and high fastness towards light from basic dyes comprising precipitating said basic dye with a complex heteropoly acid containing vanadium as an essential ingredient in addition to phosphorus.

5. A process for producing complex pigments of improved strength and high fastness towards light from basic dyes comprising precipitating said basic dyes with a complex heteropoly acid from the group consisting of phosphotungstic, phosphomolybdic, and phosphotungsticmolybdic acids, said acid containing vanadium as an essential ingredient in partial substitution for the tungsten and molybdenum content of said acids.

6. As a new article of manufacture, a complex pigment of improved strength and high fastness towards light comprising a precipitated basic dye in intimate association with a complex phosphoheteropoly acid, containing as an essential ingredient a metal from the first sub-group of group V of the periodic table of elements.

7. As a new article of manufacture, a complex pigment of improved strength and high fastness towards light comprising a precipitated basic dye in intimate association with a complex phospho-heteropoly acid, containing as an essential ingredient a small amount of a metal from the first sub-group of group V of the periodic table of elements.

8. As a new article of manufacture, a complex pigment of improved strength and high fastness towards light comprising essentially a basic dyestuff combined with a heteropoly acid from the group consisting of phosphotungstic, phosphomolybdic, and phosphotungstic-molybdic acids, and containing as an essential ingredient a metal from the first sub-group of group V of the periodic table of elements, said metal being in partial substitution for the molybdenum and tungsten content of said acids.

9. As a new article of manufacture, a complex pigment of improved strength and high fastness towards light comprising essentially a basic dyestuff combined with a heteropoly acid from the group consisting of phosphotungstic, phosphomolybdic, and phosphotungstic-molybdic acids, and containing vanadium as an essential ingredient.

10. As a new article of manufacture, a complex pigment of improved strength and high fastness towards light comprising essentially a basic dyestuff combined with a heteropoly acid from the group consisting of phosphotungstic, phosphomolybdic, and phosphotungstic-molybdic acids, and containing columbium as an essential ingredient.

11. As a new article of manufacture, a complex pigment of improved strength and high fastness towards light comprising essentially a basic dyestuff combined with a heteropoly acid from the group consisting of phosphotungstic, phosphomolybdic, and phosphotungstic-molybdic acids, and containing tantalum as an essential ingredient.

GEORGE A. PEIRCE.